United States Patent
Mtauweg

(10) Patent No.: US 11,698,057 B2
(45) Date of Patent: Jul. 11, 2023

(54) WIND TURBINE ROTARY CONNECTION, AND WIND TURBINE COMPRISING SAME

(71) Applicant: Wobben Properties GmbH, Aurich (DE)

(72) Inventor: Samer Mtauweg, Bremerhaven (DE)

(73) Assignee: Wobben Properties GmbH, Aurich (DE)

(*) Notice: Subject to any disclaimer, the term of this patent is extended or adjusted under 35 U.S.C. 154(b) by 454 days.

(21) Appl. No.: 16/624,715

(22) PCT Filed: Jun. 29, 2018

(86) PCT No.: PCT/EP2018/067609
§ 371 (c)(1),
(2) Date: Dec. 19, 2019

(87) PCT Pub. No.: WO2019/002564
PCT Pub. Date: Jan. 3, 2019

(65) Prior Publication Data
US 2021/0156363 A1 May 27, 2021

(30) Foreign Application Priority Data

Jun. 29, 2017 (DE) ..................... 10 2017 114 584.2

(51) Int. Cl.
*F03D 9/25* (2016.01)
*F16C 17/10* (2006.01)
(Continued)

(52) U.S. Cl.
CPC ............... *F03D 80/70* (2016.05); *F03D 9/25* (2016.05); *F03D 15/00* (2016.05); *F16C 17/03* (2013.01);
(Continued)

(58) Field of Classification Search
CPC . F03D 9/25; F03D 15/00; F03D 80/70; F16C 17/03; F16C 17/06; F16C 17/02;
(Continued)

(56) References Cited

U.S. PATENT DOCUMENTS 4,773,824 A * 9/1988 Kiss ........................ F03D 80/70
416/212 A
8,994,205 B2 3/2015 Castell Martínez
(Continued)

FOREIGN PATENT DOCUMENTS

CN 102985690 A 3/2013
CN 104271970 A 1/2015
(Continued)

*Primary Examiner* — Eldon T Brockman
*Assistant Examiner* — Maxime M Adjagbe
(74) *Attorney, Agent, or Firm* — Seed Intellectual Property Law Group LLP

(57) ABSTRACT

A wind turbine rotary connection for two wind turbine components which are rotatable relative to each other, having a combined axial-radial bearing, wherein the axial-radial bearing has an axial bearing component and a separate radial bearing component. In particular it is proposed that the axial bearing component is in the form of a plain bearing component having a first convexly curved bearing surface and a corresponding second concavely curved bearing surface.

20 Claims, 5 Drawing Sheets

(51) Int. Cl.
*F03D 80/70* (2016.01)
*F03D 15/00* (2016.01)
*F16C 17/03* (2006.01)

(52) U.S. Cl.
CPC ........ *F16C 17/10* (2013.01); *F05B 2220/706* (2013.01); *F05B 2240/54* (2013.01); *F16C 2360/31* (2013.01)

(58) Field of Classification Search
CPC ........ F16C 17/10; F16C 17/22; F16C 17/107; F16C 17/105; F16C 17/00; F16C 17/04; F05B 2240/50
See application file for complete search history.

(56) References Cited

U.S. PATENT DOCUMENTS

| | | | |
|---|---|---|---|
| 9,297,414 | B2 | 3/2016 | Kullin et al. |
| 9,523,353 | B2 | 12/2016 | Frank |
| 9,677,606 | B2 | 6/2017 | Pischel |
| 9,909,567 | B2 | 3/2018 | Frank et al. |
| 9,989,086 | B2 | 6/2018 | Buettner |
| 2011/0311362 | A1 | 12/2011 | Corts |
| 2012/0235420 | A1* | 9/2012 | Holm .................... F03D 7/0204 290/55 |
| 2014/0193264 | A1* | 7/2014 | Pedersen ................ F03D 15/20 416/174 |
| 2015/0016976 | A1* | 1/2015 | Roer ...................... F03D 13/10 415/182.1 |
| 2015/0017000 | A1* | 1/2015 | Sato ...................... F16C 33/103 416/174 |
| 2015/0043858 | A1* | 2/2015 | Aust ..................... F16C 19/543 384/558 |
| 2016/0025068 | A1* | 1/2016 | Frank ..................... F03D 80/70 384/492 |
| 2017/0260970 | A1* | 9/2017 | Stiesdal ................. F16C 17/10 |

FOREIGN PATENT DOCUMENTS

| | | |
|---|---|---|
| CN | 106286585 A | 1/2017 |
| DE | 3502963 A1 | 7/1986 |
| DE | 102012004329 A1 | 8/2013 |
| DE | 102015217510 A1 | 3/2017 |
| DE | 102015224912 A1 | 6/2017 |
| EP | 2955413 A1 | 12/2015 |
| EP | 2871377 B1 | 1/2017 |
| JP | 2008121761 A | 5/2008 |
| JP | 2010121644 A | 6/2010 |
| JP | 2017502221 A | 1/2017 |
| RU | 2558401 C2 | 8/2015 |
| WO | 2008/152083 A1 | 12/2008 |
| WO | 2013/091664 A1 | 6/2013 |
| WO | WO-2015022311 A1 * 2/2015 ........... F03D 1/0658 |
| WO | 2015/144460 A1 | 10/2015 |
| WO | 2016/146190 A1 | 9/2016 |

* cited by examiner

WIND TURBINE ROTARY CONNECTION, AND WIND TURBINE COMPRISING SAME

BACKGROUND

Technical Field

The present invention concerns a wind turbine plain rotary connection for two wind turbine components which are rotatable relative to each other, having a combined axial-radial bearing, wherein the axial-radial bearing has an axial bearing component and a separate radial bearing component.

Description of the Related Art

Rotary connections of the above-indicated kind are generally known. They are used for example to mount rotor blades to the rotor blade hub so that it is possible to ensure a pitch movement of the rotor blades. In addition for example the rotor blade hub and/or the generator rotor of a wind turbine and/or a main shaft of the wind turbine are supported by means of rotary connections, in particular on a machine carrier of the wind turbine. Furthermore for example the machine carrier of the wind turbine is rotatably mounted to the tower of the wind turbine by means of a rotary connection which is referred as a yaw bearing arrangement.

The rotary connection serves in each case principally to carry the axial and radial forces acting on the wind turbine components which are mounted rotatably relative to each other, and also in certain situations of use also to carry tilting moments.

In the state of the art plain bearing arrangements have sometimes been proposed for rotatably mounting components involving high speeds of movement while in relation to rotary movements involving long service lives or low speeds of rotation but in return high levels of loading, rolling bearing arrangements are principally provided. A general requirement in the design of wind turbines is increasingly that of ensuring the fatigue strength of the wind turbine components while at the same time the aim is to achieve an efficiency as high as possible in the production of electric power. As far as possible the latter is to be linked to ongoing optimization of the weight of the wind turbines and a reduction in noise emissions, which sometimes entails conflicts between the aims.

On the priority application for the present application the German Patent and Trade Mark Office searched the following state of the art: DE 10 2012 004 329 A1, DE 10 2015 217 510 A1, DE 10 2015 224 912 A1, EP 2 871 377 B1 and WO 2008/152 083 A1.

BRIEF SUMMARY

Provided is a wind turbine rotary connection which contributes to reducing noise emissions and preferably ensures a reduced rotary resistance with undiminished wear resistance.

Provided is a wind turbine rotary connection of the kind set forth in the opening part of this specification by the axial bearing component being in the form of a plain bearing component having a first convexly curved bearing surface and a corresponding second concavely curved bearing surface.

An axial bearing component, also referred to as a spherical bearing arrangement, can carry very high axial forces in comparison with the structural size thereof and nonetheless has a high degree of angle tolerance in regard to the direction of the forces acting.

By virtue of the fact that the axial bearing component is in the form of a plain bearing component, the rolling noises which are inevitably produced in the state of the art when using rolling bodies are at any event in this respect eliminated, which overall contributes to a reduction in the noise emissions.

At least one of the two bearing surfaces of the axial bearing component is formed partially or completely from a fiber composite material. Particularly preferably one of the two bearing surfaces of the axial bearing component is formed partially or completely from a fiber composite material and the other of the two bearing surfaces of the axial bearing component is formed partially or completely from a metallic material. The material pairing of metallic material and fiber composite material also provides extremely favorable wear properties, in particular emergency operating properties.

In a preferred configuration the axial bearing component, the radial bearing component or both bearing components (the axial bearing component and the radial bearing component) are of an annular configuration. The significantly increases the flexibility in terms of installation of the rotary connection as a through passage can be provided in the center of rotation or there is the possibility of mounting on for example a main shaft.

In a first preferred alternative the radial bearing component is in the form of a rolling bearing.

In a second preferred alternative the radial bearing component is also in the form of a plain bearing, in particular selected from one of the following bearing types: cylindrical plain bearing, multi-surface plain bearing, in particular a lemon bore bearing, and segmented plain bearing, preferably with tilt segments. The term lemon bore bearing is used to denote a multi-surface plain bearing having an outer ring which, instead of a circular cross-section, is of a cross-section composed of two or more arcuate taper surfaces so that the arrangement involves regions of differing gap widths along the periphery of the bearing clearance.

In a further preferred configuration of the rotary connection the combined axial-radial bearing is a first bearing and the rotary connection additionally has a second bearing.

Particularly preferably the second bearing is also a combined axial-radial bearing with an axial and a separate radial bearing component, wherein the axial bearing component is in the form of a plain bearing component having a first convexly curved bearing surface and a corresponding second concavely curved bearing surface.

Preferably in the second bearing at least one of the bearing surfaces of the axial bearing component is formed partially or completely from a fiber composite material. Further preferably in the case of the second bearing one of the two bearing surfaces of the axial bearing component is formed partially or completely from a fiber composite material and the other of the two bearing surfaces of the axial bearing component is formed partially or completely from a metallic material.

Further preferably in the second bearing the axial bearing component is of an annular configuration. Further preferably in the second bearing the radial bearing component is of an annular configuration. Further preferably in the second bearing the radial bearing component is in the form of a rolling bearing arrangement. Alternatively preferably in the second bearing the radial bearing component is in the form of a plain bearing arrangement, in particular selected from one of the following bearing types: cylindrical plain bearing, lemon bore bearing, segmented plain bearing, preferably with tilt segments.

In a further preferred configuration of the rotary connection the first and the second axial-radial bearing are arranged in directly mutually adjoining relationship and with the axial bearing components in mutually adjacent relationship. Alternatively preferably the first and the second combined axial-radial bearing are arranged in directly mutually adjoining relationship and with the radial bearing components in mutually adjacent relationship.

In a further preferred alternative the first and the second combined axial-radial bearings are arranged in mutually spaced relationship. The spacing in particular of the radial bearing components from each other significantly increases the capability of carrying tilting moment of the rotary connection. The directly mutually adjoining arrangement of the two combined axial-radial bearings can advantageously be used as a moment bearing arrangement.

Particularly preferably the embodiment with directly mutually adjoiningly arranged combined axial-radial bearings is further developed in that the rotary connection further has a third bearing which is arranged spaced in relation to the arrangement of the first and second axial-radial bearings, the third bearing preferably being a radial bearing. Particularly preferably the third bearing is of an annular configuration and in particular is in the form of a plain bearing. Preferably the plain bearing arrangement is selected from one of the following bearing types:

Cylindrical plain bearing, lemon bore bearing, segmented plain bearing, preferably with tilt segments.

This configuration can be used based on the model of a fixed/floating bearing arrangement on the wind turbine.

In a further aspect the invention concerns a wind turbine having the following components:

A number of rotor blades, a rotor blade hub to which the rotor blades are rotatably mounted, a generator having a generator rotor and a generator stator, wherein the generator rotor and the rotor blade hub are coupled together by means of a main shaft and preferably a transmission, a machine carrier to which the generator, in particular the generator stator is mounted, and a tower on which the machine carrier is arranged.

In a wind turbine of the above-indicated kind the invention attains the object as specified hereinbefore in that one, a plurality of or all of the components are mounted rotatably by means of a rotary connection according to one of the above-described preferred embodiments. Particularly preferably in the wind turbine the rotor blades are mounted rotatably to the rotor blade hub. Alternatively or additionally the rotor blade hub and/or the generator rotor and/or the main shaft is mounted to the generator stator. Alternatively or additionally the rotor blade hub and/or the generator and/or the main shaft is mounted rotatably to the machine carrier.

Alternatively or additionally the machine carrier is mounted rotatably to the tower.

In regard to the advantages of the preferred configurations of the wind turbine and its rotary connection attention is directed to the above-described preferred configurations in accordance with the first aspect.

Preferably the rotary connection for mounting the rotor blade hub and/or the generator and/or the main shaft on the generator stator or the machine carrier to the tower is in the form of a hydrodynamic plain rotary connection. In that way it is possible to implement in particular also high rotary speeds with a low level of wear of even substantially wear-free.

In a further preferred configuration in which the rotary connection is adapted to mount the rotor blades to the rotor blade hub and/or to mount the machine carrier to the tower of the wind turbine the rotary connection is preferably in the form of a dry-running plain rotary connection. The speed of rotation with that kind of bearing arrangements is comparatively low and the service lives are comparatively high so that thermal lubrication is not necessary or does not promise any advantages. Here however in particular the emergency running properties of the preferred material pairing as described hereinbefore comprising a fiber composite material and a metallic material become important.

BRIEF DESCRIPTION OF THE SEVERAL VIEWS OF THE DRAWINGS

The invention is described in greater detail hereinafter with reference to the accompanying Figures by means of preferred embodiments by way of example. In the Figures.

DETAILED DESCRIPTION

Figure 1:
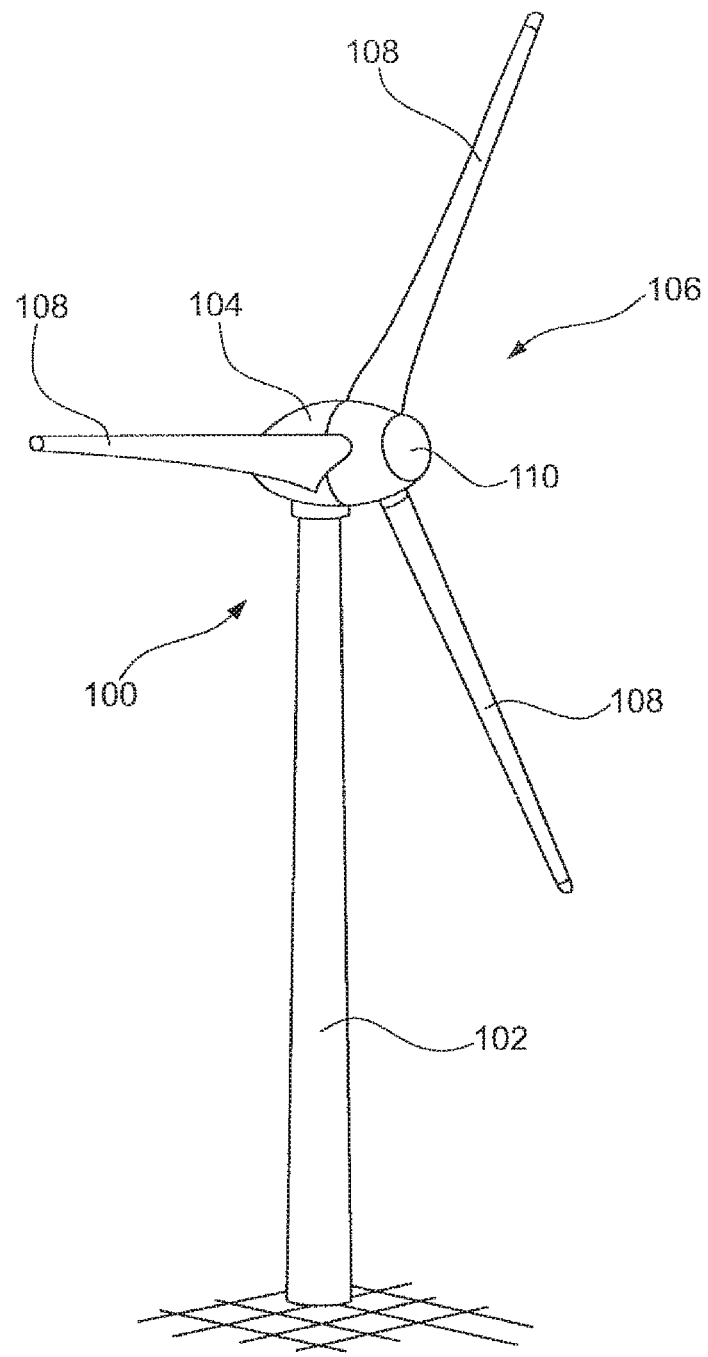
FIG. 1 shows a diagrammatic perspective view of a wind turbine.

FIG. 1 shows a wind turbine 100 comprising a tower 102 and a pod 104. Arranged at the pod 104 is a rotor 106 having three rotor blades 108 and a spinner 110. In operation the rotor 106 is caused to rotate by the wind and thereby drives a generator 101 (FIG. 2) in the pod 104.

The pod 104 is shown as a sectional view in FIG. 2. The pod 104 is mounted rotatably to the tower 102 and connected driven in generally known manner by means of a yaw drive 112. Also arranged in generally known manner in the pod 104 is a machine carrier 110 having a trunnion 114.

The generator 101 has a generator stator 105 which is fixed by means of the trunnion 114 to the machine carrier 110 in the pod 104. Other possible design configurations provide, for example, that the generator stator 105 is joined directly to the machine carrier 110 or a corresponding component part of the pod 104.

Figure 2A:
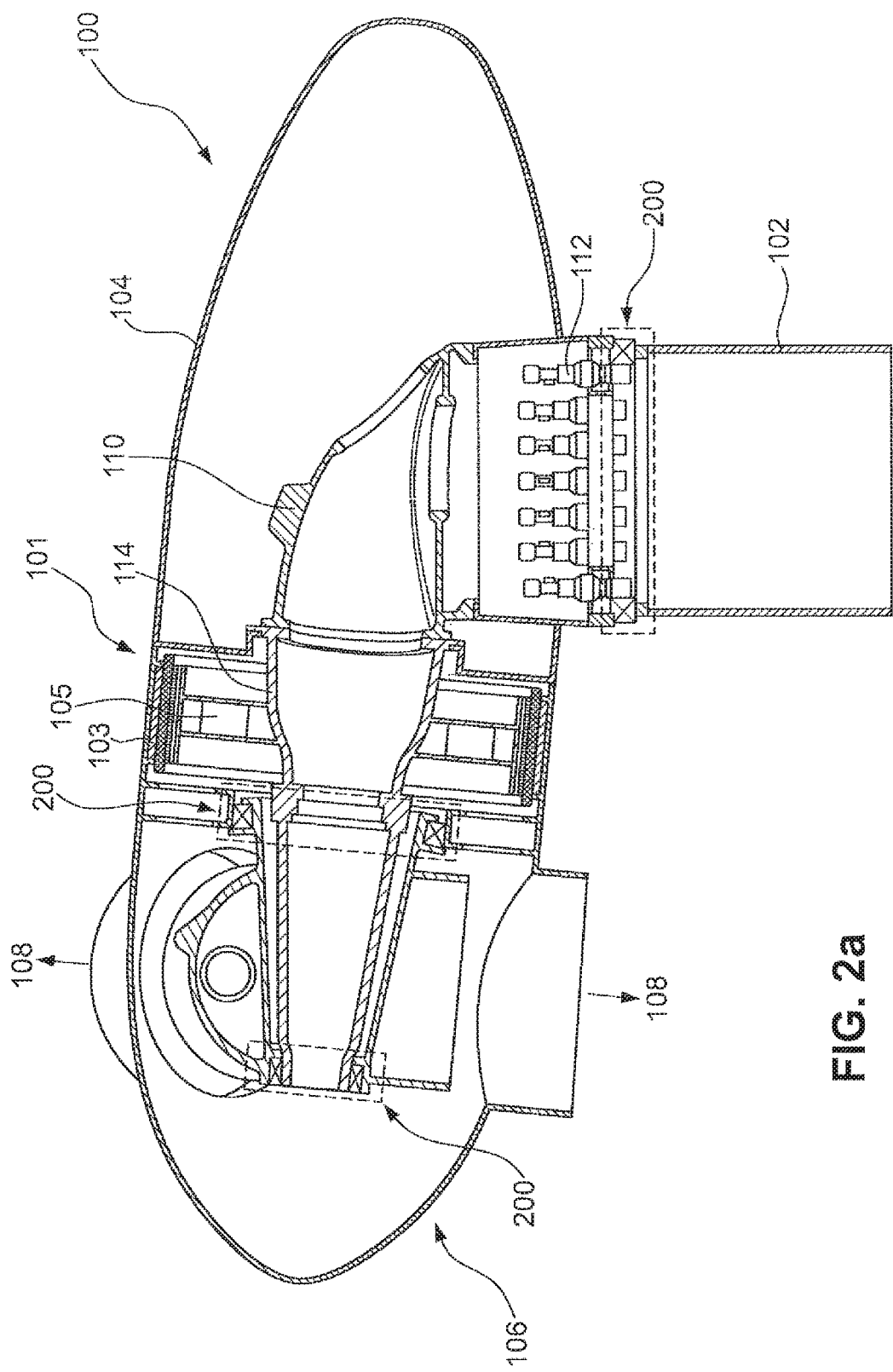
FIG. 2a shows a diagrammatic sectional view of a pod of the wind turbine of FIG. 1 according to a first preferred embodiment.

The generator 101 shown in FIG. 2a has a generator rotor 103 designed in the form of an external rotor. The rotor blades 108 are mounted rotatably relative to the hub 106 with a rotary connection 200.

The hub 106 and the generator rotor 103 are mounted rotatably relative to the trunnion 114 by means of a rotary connection 200.

The machine carrier 110—and with it the pod 104—are mounted rotatably relative to the tower 102 by means of a rotary connection 200.

One, a plurality of or all of the rotary connections 200 indicated in FIG. 2 are preferably of the design configuration as shown in FIG. 3a, 3b or 4a-4f, which are described in greater detail hereinafter.

Figure 2B:
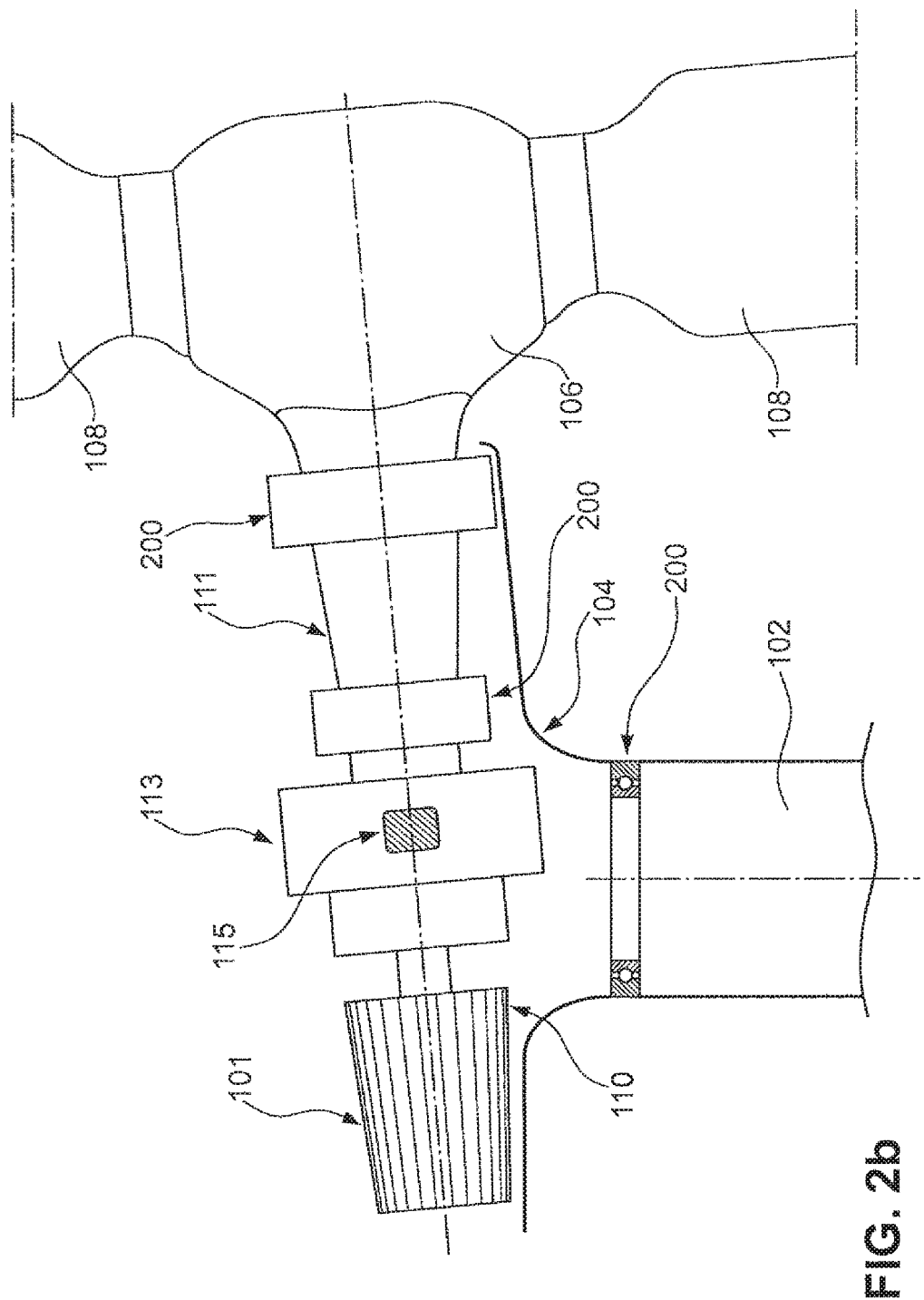
FIG. 2b shows a diagrammatic sectional view of a pod of the wind turbine of FIG. 1 according to a second preferred embodiment, FIGS. 3a, b show diagrammatic cross-sectional views of a rotary connection in two preferred configurations, for a wind turbine as shown in FIG. 2a or 2b, and FIGS. 4a-4f show various preferred diagrammatic bearing arrangements of the rotary connections of FIGS. 3a and 3b for a wind turbine as shown in FIG. 2a or 2b.

While FIG. 2a showed a wind turbine 100 having an external rotor generator FIG. 2b shows an alternative structure having a transmission gear generator. The generator 101 preferably has an internal rotor as its generator rotor, being non-rotatably connected to a main shaft 111. Preferably a gear transmission 113 is interposed between the generator 101 and the main shaft 111. The transmission 113 is preferably connected by means of a torque support 115 to the machine carrier 110 or other structural components of the pod 104 of the wind turbine 100. In addition mounted non-rotatably to the main shaft 110 is the hub 106 and mounted thereto are the rotor blades 108, in that respect involving the same principle as in FIG. 2a.

The main shaft is mounted to the pod 104 by means of a rotary connection 200.

In addition the pod 104 is mounted rotatably to the tower 102 by means of a yaw bearing which is also characterized in the form of a rotary connection 200.

In regard also to the embodiment of FIG. 2b, attention is directed to following FIGS. 3a, 3b and 4a-4f, showing different possible configurations for the rotary connections 200.

Figure 3A:
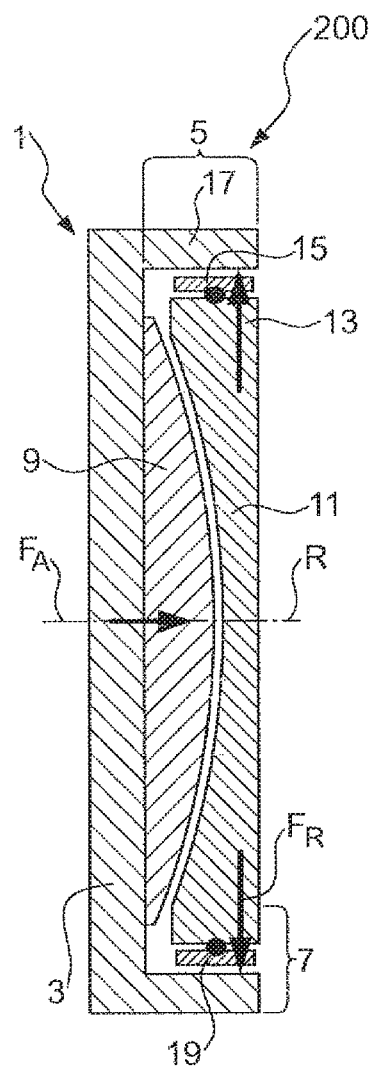

In FIG. 3a a rotary connection 200 is designed in accordance with a first preferred configuration. The rotary connection 200 has a combined axial-radial bearing 1. The bearing 1 has a main body 3 which functions as a carrier. An axial bearing component 5 and a radial bearing component 7 are provided on the carrier 3. The axial bearing component 5 has a first convexly shaped bearing surface 9 and a second corresponding concavely shaped bearing surface 11.

Radially outside and axially adjacent in relation to an axis of rotation R the rotary connection has an inner ring 13 and an outer ring 17 for the radial bearing component 7. Preferably a plurality of plain bearing segments 15 are provided at the inner ring 13 or the outer ring 17 (this is not shown) and particularly preferably the plain bearing segments 15 are arranged pivotably by means of a tilt mechanism 19 on the inner ring 13 (or alternatively the outer ring 17, not shown).

The combined axial-radial bearing 1 shown in FIG. 3a is advantageously adapted to carry axial forces $F_A$ acting in the direction of the axis of rotation R, and radial forces $F_R$ acting perpendicularly thereto.

Figure 3B:
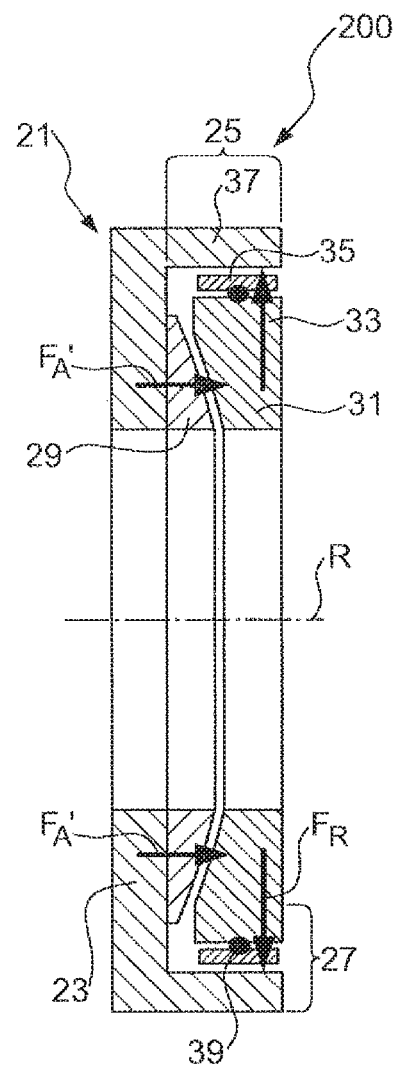

FIG. 3b shows an alternative configuration in relation to the combined axial-radial bearing 1 shown in FIG. 3a. The combined axial-radial bearing 21 shown in FIG. 3b has a carrier 23 of an annular configuration. An axial bearing component 25 with a radial bearing component 27 is provided on the carrier 23, the axial bearing component 25 also being of an annular configuration. The axial bearing component 25 has a first convexly curved bearing surface 29 and a corresponding second concavely curved bearing surface 31. Radially outwardly and axially adjacent to those bearing surfaces the axial-radial bearing 21 has an inner ring 33 and an outer ring 37 of the radial bearing component 27. In addition there are a plurality of plain bearing segments 35 which, similarly to the view in FIG. 3a, are in the form of tilt segments with a pivoting mechanism 39 on the inner ring 33 (alternatively however they can also be provided on the outer ring 37).

The axial forces $F_A$ are carried by the axial bearing component 25 in substantially the same function in relation to the view shown in FIG. 3a while the forces $F_R$ acting in the radial direction are carried by the radial bearing component 27.

Figure 4A:
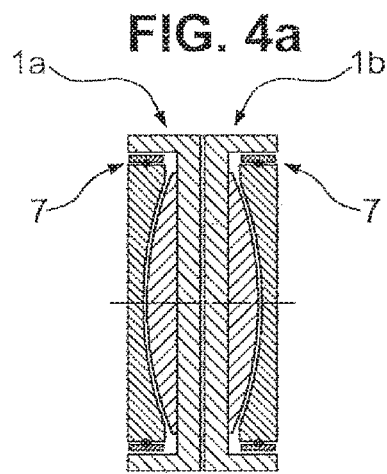
Figure 4B:
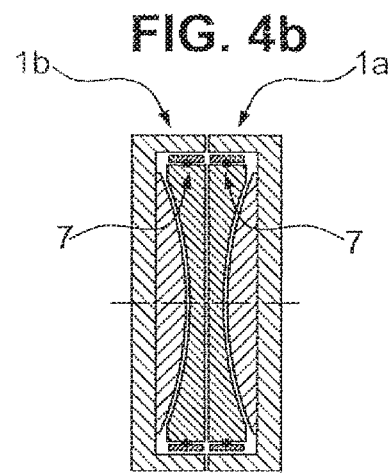

FIGS. 4a, 4b, 4c, 4d, 4e and f show preferred arrangements of the axial-radial bearing 1 shown in FIG. 3a. It should be understood that, alternatively to the axial-radial bearing, the axial-radial bearing 21 can also be arranged in the same manner. The arrangement in FIG. 3a and FIG. 3b respectively shows a first combined axial-radial bearing 1a and a second combined axial-radial bearing 1b which are respectively arranged in directly mutually adjoining relationship. As shown in FIG. 3a the two combined axial-radial bearings 1a, 1b are oriented relative to each other in such a way that the radial bearing components 7 are arranged facing away from each other. In the view in FIG. 3b the two combined axial-radial bearings 1a, 1b are oriented in such a way that the radial bearing components 7 are oriented in mutually facing relationship. The arrangement shown in FIGS. 4a, 4b is suitable in particular for a moment bearing arrangement.

The carrying capability for tilting moments, based on arrangements as shown for example in FIGS. 4a and 4b, is further increased if the two combined axial-radial bearings 1a, 1b are spaced from each other.

Figure 4C:
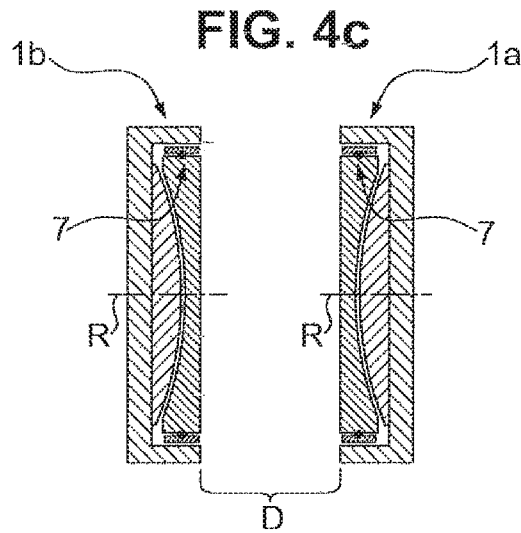
Figure 4D:
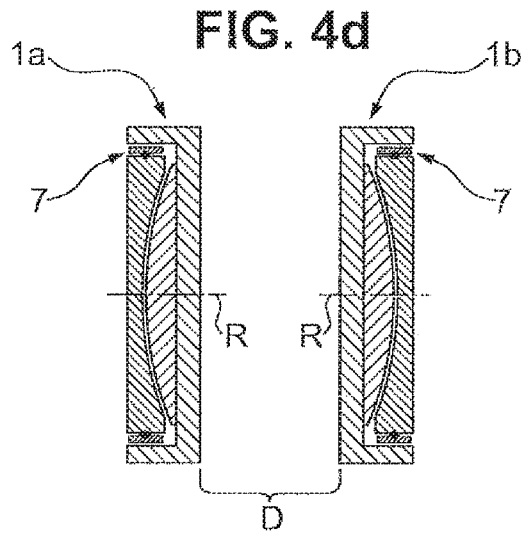

Such configurations are shown by way of example in FIGS. 4c, 4d. Here in each case the first combined axial-radial bearing 1a is spaced by a predetermined distance D from the second combined axial-radial bearing 1b. As also in FIGS. 4a, 4b shown here are respective configurations in which the radial bearing components 7 are facing towards each other (FIG. 4c) or away from each other (FIG. 4d). The bearing arrangement shown in FIGS. 4c, 4d is suitable in particular as a support bearing arrangement.

Figure 4E:
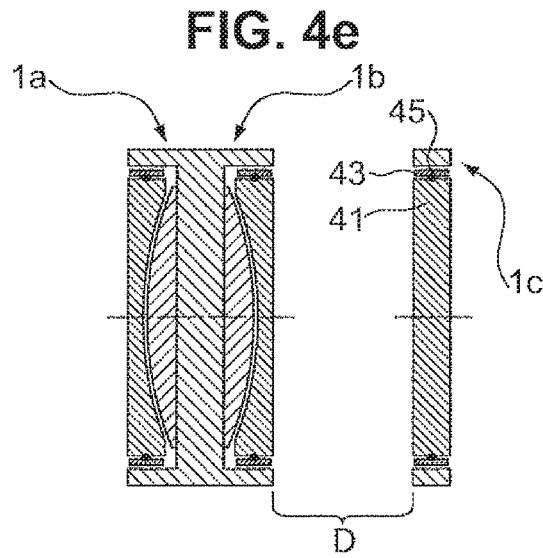
Figure 4F:
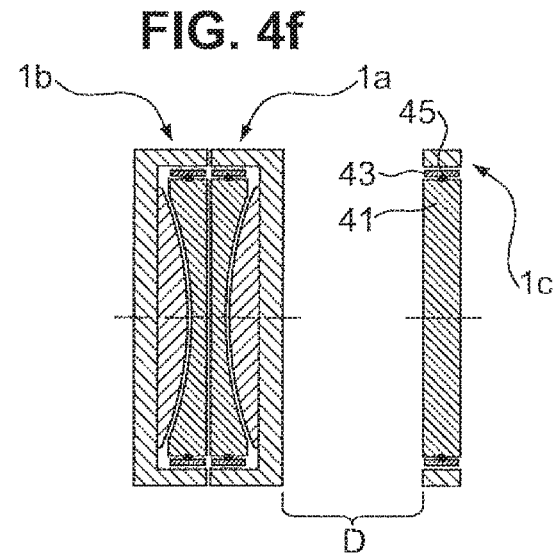

FIGS. 4e, 4f, as a continuation of the bearing designs already described hereinbefore, set forth two proposals which in addition to the two combined axial-radial bearings 1a, 1b have a third bearing 1c. The two combined axial-radial bearings 1a, 1b are arranged in directly mutually adjoining relationship, similarly to FIGS. 4a, 4b, while the third bearing 1c is arranged at a predetermined distance D spaced therefrom. This kind of bearing is preferably suitable for a fixed/floating bearing arrangement.

In the illustrated variant the third bearing 1c is in the form of a radial plain bearing, a plurality of plain bearing segments 43 being arranged on an inner ring 41, particularly preferably in the form of tilt segments which are fixed to the inner ring 41 by a pivoting mechanism 45.

The invention claimed is:

1. A wind turbine rotary connection for two wind turbine components which are rotatable relative to each other, the wind turbine rotary connection comprising:
   a combined axial-radial bearing, wherein the combined axial-radial bearing has an axial bearing component and a radial bearing component,
   wherein the axial bearing component is a plain bearing component having a first convexly curved bearing surface and a second concavely curved bearing surface forming a spherical bearing arrangement.

2. The wind turbine rotary connection according to claim 1 wherein at least one of the first convexly and second concavely curved bearing surfaces of the axial bearing component is formed partially or completely from a fiber composite material.

3. The wind turbine rotary connection according to claim 1 wherein one of the first convexly and second concavely curved bearing surfaces of the axial bearing component is formed partially or completely from a fiber composite material and the other of the first convexly and second concavely curved bearing surfaces of the axial bearing component is formed partially or completely from a metallic material.

4. The wind turbine rotary connection according to claim 1 wherein the axial bearing component is of an annular configuration.

5. The wind turbine rotary connection according to claim 1 wherein the radial bearing component is of an annular configuration.

6. The wind turbine rotary connection according to claim 1 wherein the radial bearing component is a rolling bearing.

7. The wind turbine rotary connection according to claim 1 wherein the radial bearing component is a plain bearing selected from one of the following bearing types:
 cylindrical plain bearing,
 a lemon bore bearing, and
 segmented plain bearing.

8. The wind turbine rotary connection according to claim 1 wherein the combined axial-radial bearing is a first combined axial-radial bearing and the rotary connection has a second bearing.

9. The wind turbine rotary connection according to claim 8 wherein the second bearing is a second combined axial-radial bearing with an axial bearing component and a radial bearing component, wherein the axial bearing component is a plain bearing component having a first convexly curved bearing surface and a second concavely curved bearing surface.

10. The wind turbine rotary connection according to claim 9 wherein the first convexly curved and the second concavely curved bearing surfaces are arranged in directly mutually adjoining relationship and with the axial bearing components in mutually adjacent relationship.

11. The wind turbine rotary connection according to claim 9 wherein the first convexly curved and the second concavely curved bearing surfaces are arranged in directly mutually adjoining relationship and with the radial bearing components in mutually adjacent relationship.

12. The wind turbine rotary connection according to claim 8 wherein the first convexly curved and the second concavely curved bearing surfaces are arranged in mutually spaced relationship.

13. The wind turbine rotary connection according to claim 10 comprising a third bearing arranged spaced in relation to the arrangement of the first convexly curved and the second concavely curved bearing surfaces.

14. A wind turbine, comprising:
 a plurality of rotor blades;
 a rotor blade hub, the plurality of rotor blades rotatably mounted to the rotor blade hub by first connections;
 a generator having a generator rotor and a generator stator, wherein the generator rotor and the rotor blade hub are coupled together by a second connection; a machine carrier, wherein the generator is mounted to the machine carrier by a third connection; and
 a tower, the machine carrier coupled to the tower by a fourth connection,
 wherein at least one of: the first, second, third, or fourth connections forms a rotary connection that is the wind turbine rotary connection according to claim 1.

15. The wind turbine according to claim 14 wherein at least one of: the first, second, third, or fourth connection is a hydrodynamic plain rotary connection.

16. The wind turbine according to claim 14 wherein at least one of: the first, second, third, or fourth connection is a dry-running plain rotary connection.

17. The wind turbine according to claim 14 wherein the generator rotor and the rotor blade hub are coupled together directly.

18. The wind turbine according to claim 14 wherein the generator rotor and the rotor blade hub are coupled together by a main shaft and a transmission.

19. The wind turbine rotary connection according to claim 13 wherein the third bearing is a radial bearing.

20. The wind turbine rotary connection according to claim 1 wherein the radial bearing component is a segmented plain bearing with tilt segments.

\* \* \* \* \*